(12) United States Patent
Govindarajan et al.

(10) Patent No.: US 11,704,263 B2
(45) Date of Patent: Jul. 18, 2023

(54) CONFIGURABLE MULTI-FUNCTION PCIE ENDPOINT CONTROLLER IN AN SOC

(71) Applicant: Texas Instruments Incorporated, Dallas, TX (US)

(72) Inventors: Sriramakrishnan Govindarajan, Bengaluru (IN); Kishon Vijay Abraham Israel Vijayponraj, Bengaluru (IN); Mihir Narendra Mody, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/697,114

(22) Filed: Mar. 17, 2022

(65) Prior Publication Data

US 2022/0206970 A1 Jun. 30, 2022

Related U.S. Application Data

(63) Continuation of application No. 17/134,861, filed on Dec. 28, 2020, now Pat. No. 11,314,673.

(30) Foreign Application Priority Data

Dec. 27, 2019 (IN) .............................. 201941054232

(51) Int. Cl.
  *G06F 13/20* (2006.01)
  *G06F 13/42* (2006.01)
(52) U.S. Cl.
  CPC .......... *G06F 13/20* (2013.01); *G06F 13/4221* (2013.01); *G06F 13/4282* (2013.01); *G06F 2213/0024* (2013.01); *G06F 2213/0026* (2013.01)

(58) Field of Classification Search
  CPC ... G06F 13/20; G06F 13/4221; G06F 13/4282
  See application file for complete search history.

(56) References Cited

U.S. PATENT DOCUMENTS

| 9,864,701 B1 | 1/2018 | Khan |
| 10,083,141 B2 | 9/2018 | Su |
| 10,310,974 B2 | 6/2019 | Liang |

(Continued)

*Primary Examiner* — Henry Tsai
*Assistant Examiner* — Christopher A Daley
(74) *Attorney, Agent, or Firm* — Krista Y. Chan; Frank D. Cimino

(57) ABSTRACT

A configurable multi-function Peripheral Component Interchange Express (PCIe) endpoint controller, integrated in a system-on-chip (SoC), that exposes multiple functions of multiple processing subsystems (e.g., peripherals) to a host. The SoC may include a centralized transaction tunneling unit and a multi-function interrupt manager. The processing subsystems output data to the host via the centralized transaction tunneling unit, which translates addresses provided by the host to a local address of the SoC. Therefore, the centralized transaction tunneling unit enables those processing subsystems to consume addresses provided by the host without the need for software intervention and software-based translation. The SoC may also provide isolation between each function provided by the processing systems. The multi-function interrupt manager enables the endpoint controller to propagate interrupt messages received from the processing subsystems to the host.

17 Claims, 9 Drawing Sheets

(56) References Cited

U.S. PATENT DOCUMENTS

| | | |
|---|---|---|
| 10,846,250 B2 | 11/2020 | Thomas |
| 11,314,673 B2* | 4/2022 | Govindarajan ..... G06F 13/4282 |
| 2006/0206655 A1* | 9/2006 | Chappell ............. G06F 13/4027 |
| | | 710/316 |
| 2014/0281070 A1 | 9/2014 | Natu |
| 2015/0127878 A1 | 5/2015 | Regula |
| 2017/0317691 A1 | 11/2017 | Craddock |
| 2020/0117525 A1 | 4/2020 | Kachare |
| 2021/0036887 A1 | 2/2021 | Meng |

* cited by examiner

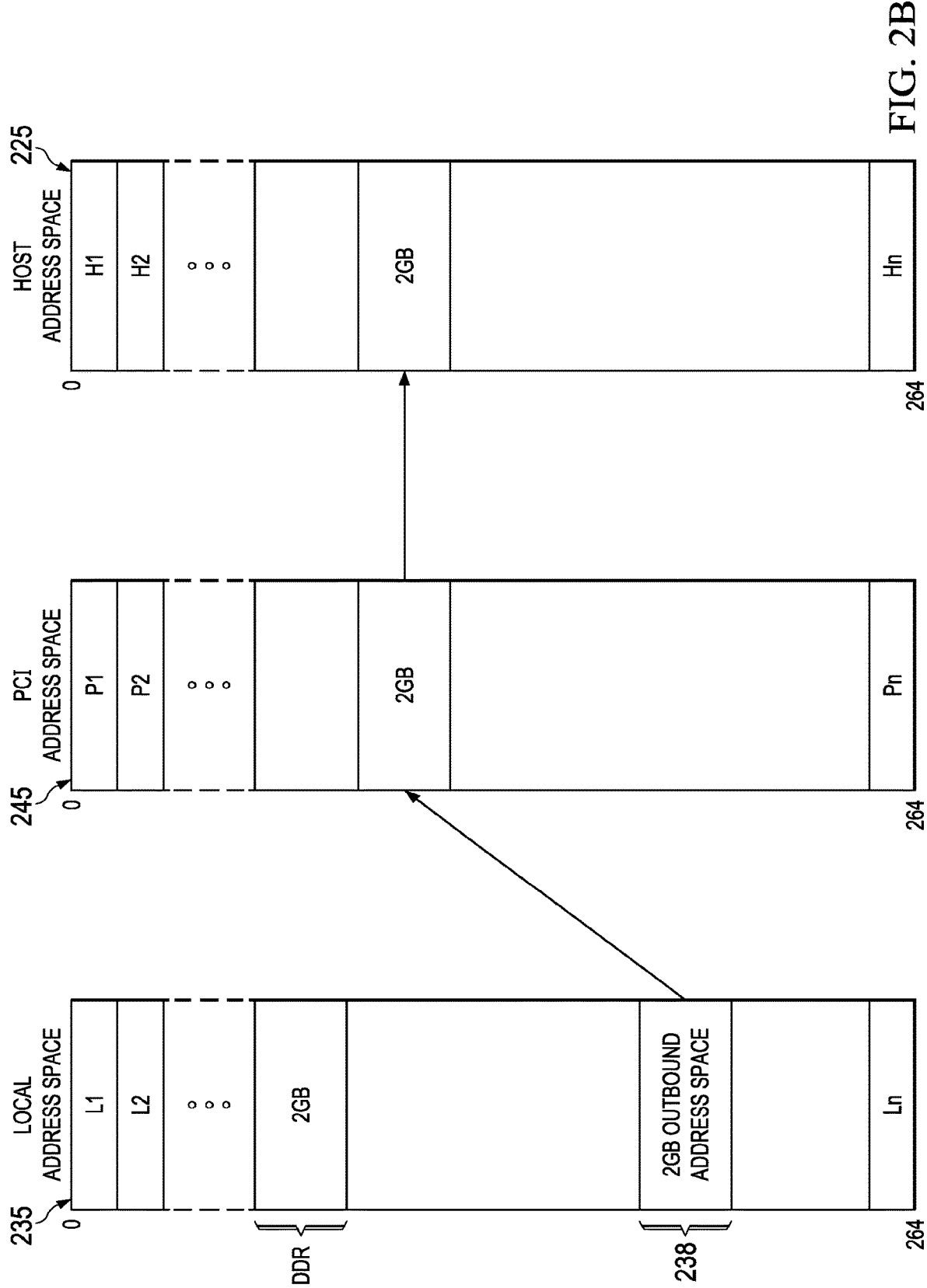

CONFIGURABLE MULTI-FUNCTION PCIE ENDPOINT CONTROLLER IN AN SOC

CROSS-REFERENCE TO RELATED APPLICATIONS

This application is a continuation of U.S. patent application Ser. No. 17/134,861 filed Dec. 28, 2020, which claims priority to India Provisional Application No. 201941054232, filed Dec. 27, 2019, which are hereby incorporated by reference.

BACKGROUND

Computing systems may include a host in communication with a number of endpoints. Endpoints may include a single-function endpoints and multi-function endpoints. Single-function endpoints perform a single function (e.g., an ethernet adaptor). Multi-function endpoints perform multiple functions using the same physical link to the host via a bus. A multi-function endpoint may include, for example, universal serial bus (USB) and serial advance technology attachment (SATA) communications. Endpoint functions may include physical functions (e.g., ethernet, USB, and SATA communications) and may also include virtual functions, which represent predefined slices of physical resources. For example, an endpoint may be a graphics processing unit (GPU) and a virtual function may be used to represent frame buffer memory and cores of the GPU.

There are a number of protocols and standards for communication between a host and an endpoint. One such standard is the Peripheral Component Interconnect Express (PCIe) standard.

SUMMARY

Provided is configurable multi-function Peripheral Component Interconnect Express (PCIe) endpoint controller, integrated in a system-on-chip (SoC), that exports multiple functions of multiple processing subsystems (e.g., peripheral devices) to a host.

An SoC contains configurable multi-function endpoint controller, centralized transaction tunneling unit. The configurable multi-function endpoint controller will also contain an outbound address translation unit (ATU). When the host provides a PCI address in the PCI address space, that PCI address is provided to a processing subsystem. The processing subsystem outputs data to the centralized transaction tunneling unit, which translates the PCI address to a local address of the SoC. The outbound ATU translates that local address to the PCI address provided by the host. The centralized transaction tunneling unit may translate the PCI address to the local address using region-based translation. The centralized transaction tunneling unit may be realized by a hardware device integrated in the SoC.

The configurable multi-function PCIe endpoint controller in an SoC may include an outbound address space corresponding to PCI addresses provided by the host. The centralized transaction tunneling unit may partition the outbound address space such that each of the plurality of functions provided by the controller is assigned a partition in the outbound address space. Those functions may be performed by one of a plurality of processing subsystems that each output a unique credential. The centralized transaction tunneling unit may store a translation table mapping each unique credential to the partition in the outbound address space reserved for the function performed by the processing subsystem that output the unique credential.

The configurable multi-function PCIe endpoint controller in an SoC may also include an inbound address space that is partitioned such that each function is associated with one of the partitions in the inbound address space. Each partition may include a first entry that is mapped to a control register of the processing subsystem that performs the function associated with that partition and a second entry for the host to populate the PCI address for the processing subsystem to provide data.

The configurable multi-function PCIe endpoint controller in an SoC may also include an interrupt manager that stores an interrupt table that includes the potential interrupt requests that may be output by the processing subsystems, message signaled interrupts (MSI) data specified by the host for propagating each of the interrupt requests, and outbound addresses that, when translated by the outbound ATU, correspond to MSI addresses specified by the host to propagate those interrupt requests. In response to an interrupt request from one of the plurality of processing subsystems, the interrupt manager may be configured to output the MSI data specified by the host to the outbound address that corresponds to the MSI addresses specified by the host. The interrupt manager may be realized by software instructions stored in the local memory and executed by the processor.

BRIEF DESCRIPTION OF THE DRAWINGS

For a detailed description of various examples, reference will now be made to the accompanying drawings in which:

FIGS. 2A through 2C are diagrams illustrating a conventional multi-function PCIe endpoint controller integrated in a system-on-chip (SoC);

DETAILED DESCRIPTION

Figure 1:
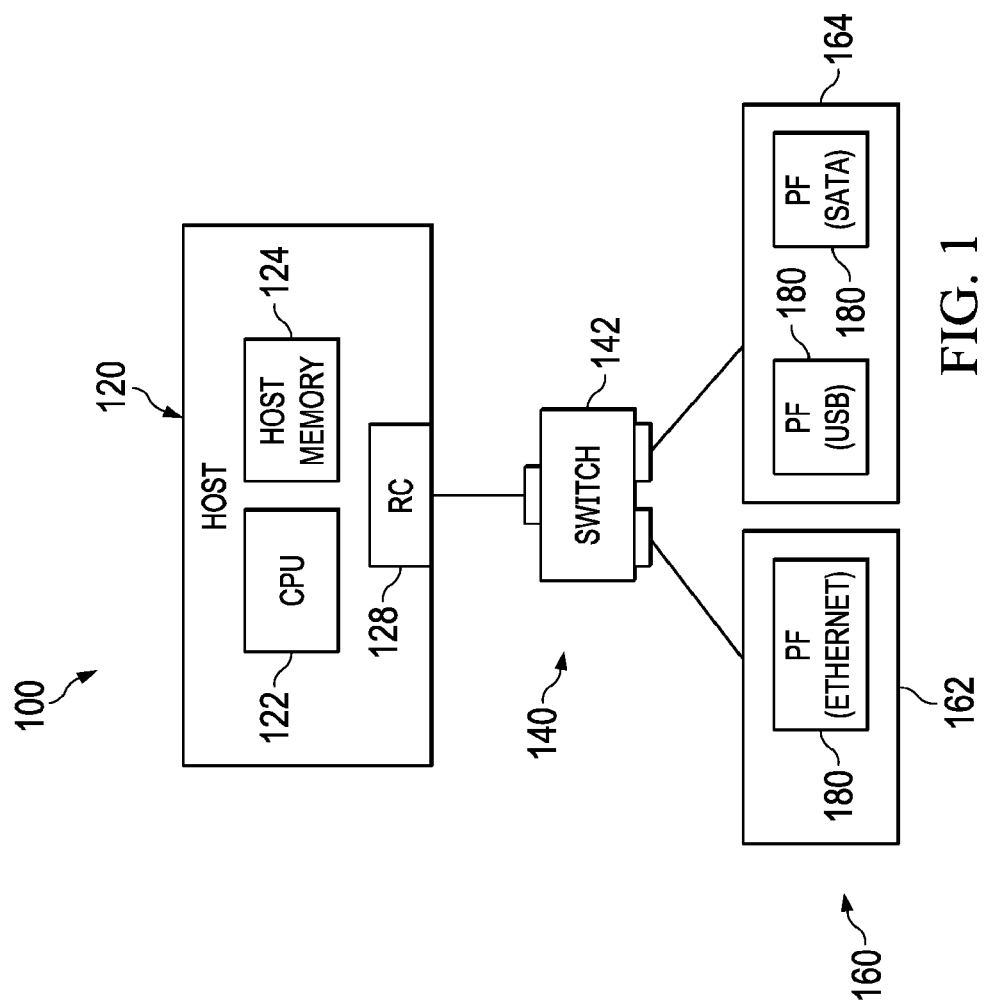
FIG. 1 is a diagram illustrating a conventional Peripheral Component Interconnect Express (PCIe) topology.

FIG. 1 is a diagram of a conventional Peripheral Component Interconnect Express (PCIe) topology 100.

As shown in FIG. 1, the PCIe topology 100 includes a host 120 connected to PCIe endpoints 160 via a PCI bus 140. The host 120 includes one or more processors 122 and memory 124.

The bus 140 may include one or more switching devices 142 enabling multiple endpoints 160 to communicate with the host 120 via the bus 140. In a PCI Express (PCIe) topology 100, the host 120 includes a root complex 128 that connects the processor 122 and memory 124 subsystem to the PCI Express switch fabric composed of one or more switch devices 142.

The PCIe endpoints 160 may include a single-function endpoint 162 and a multi-function endpoint 164. Single-function endpoints 162 perform a single function 180. A single function endpoint 162 may be, for example, an ethernet adaptor. Multi-function endpoints 164 perform multiple functions 180 using the same physical link to the host 120 via the bus 140. A multi-function endpoint 164 may include, for example, universal serial bus (USB) and serial advance technology attachment (SATA) communications. Endpoint functions 180 may include physical functions (e.g., ethernet, USB, and SATA communications) and may also include virtual functions, which represent predefined slices of physical resources. For example, an endpoint 160 may be a graphics processing unit (GPU) and a virtual function may be used to represent frame buffer memory and cores of the GPU.

The functions 180 performed by each endpoint 160 may be fixed. For example, an endpoint 160 may be a PCIe USB card that provides a USB port and enables the host 120 to communicate with a USB peripheral connected via the USB port.

In contrast to fixed-function endpoints 160, an endpoint 160 may be integrated into a system on chip (SoC) that can be dynamically reconfigured to perform different functions 180. An SoC is an integrated circuit that integrates all or most components on the integrated circuit. An SoC may include a processor, memory, input/output ports, secondary storage, etc.

Figure 2A:
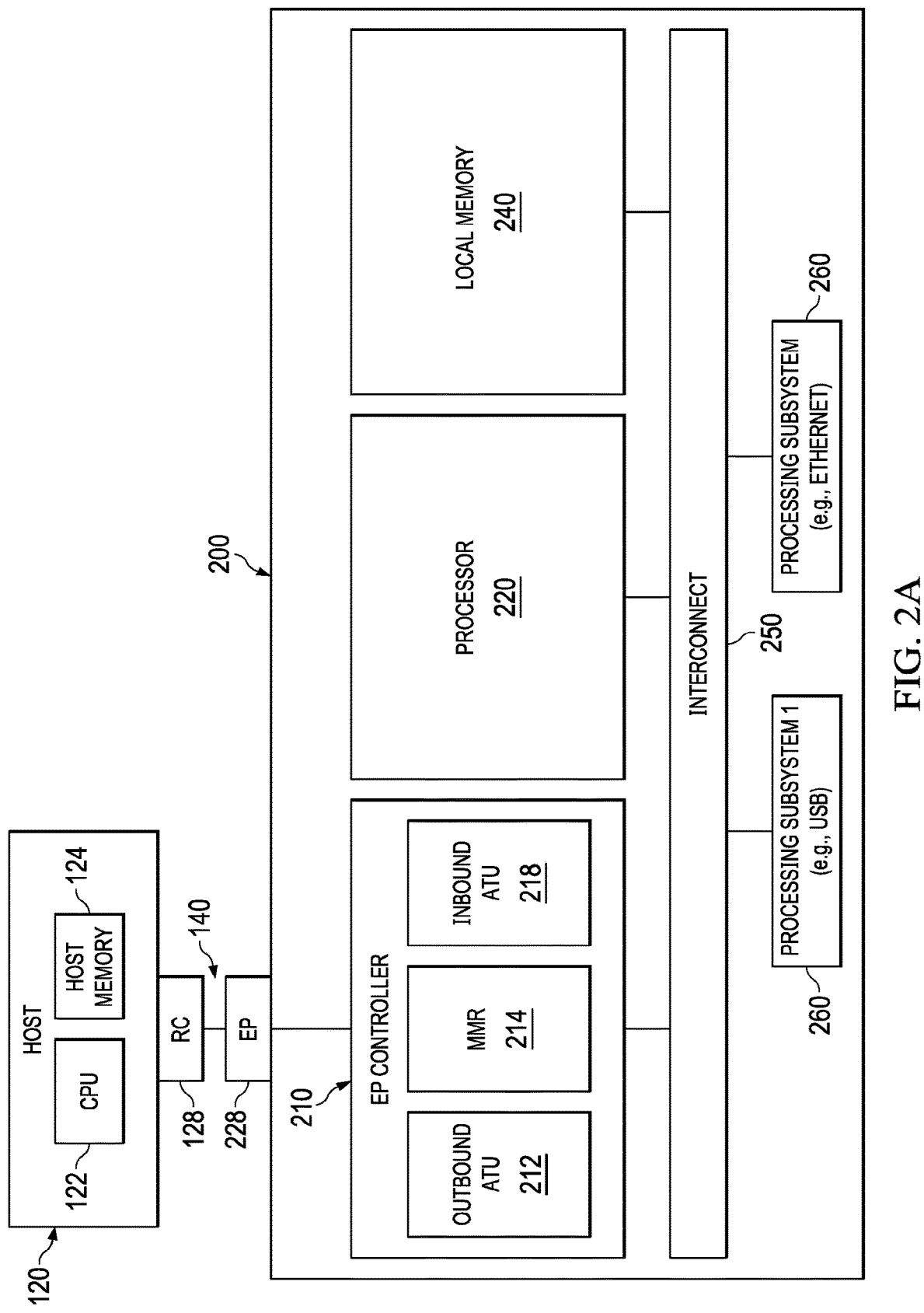

FIG. 2A is a diagram of a conventional multi-function endpoint controller integrated in an SoC 200.

As shown in FIG. 2A, the SoC 200 includes an endpoint connector 228, an endpoint controller 210, a processor 220, local memory 240, and processing subsystems 260 that communicate via an interconnect 250. The endpoint controller 210 includes an outbound address translation unit (ATU) 212, memory mapped registers 214, and an inbound ATU 218. Each processing subsystem 260 may be a peripheral device, a hardware accelerator, or any other processing device that provides functionality to the host 120. As described above, each processing subsystem 260 may perform one or more functions. The functions performed by each processing subsystem 260 may be exported as physical functions or virtual functions to the host 120.

The SoC 200 enables the host 120 to utilize each processing subsystem 260 via the PCI bus 140. Ideally, the SoC 200 can be configured and reconfigured, depending on the particular implementation, so some peripheral subsystems 260 are available to the host 120 and others provide information to local memory 240.

There is a need for mufti-function endpoint controllers integrated in an SoC. In an automotive implementation, for example, an automobile may have a host 120 connected to a large number of endpoints 160, including cameras (connected via a camera serial interface (CSI)) and sensors (connected via ethernet). While each iteration of the automobile may include a host 120 with more processing capabilities, the endpoints 160 and functions 180 may be relatively constant. Accordingly, by connected each of the endpoints 160 to the PCI bus 140 and the host 120 via a multi-function endpoint controller integrated in an SoC, the host 120 can be upgraded while the endpoints 160 and endpoint controller remain the same. Similarly, industrial or even personal computing implementations, an SoC multi-function endpoint controller can export multiple functions of multiple processing subsystems (e.g., peripherals) to a host. However, conventional multi-function endpoint controllers have a number of drawbacks.

First, SoCs utilize their own local address space, which is independent of the address space utilized by the host 120.

FIG. 2B is a diagram illustrating the address spaces utilized by a host 120 and an SoC 200 and communicating via a PCI bus 140.

In computing, an address space defines a range of discrete addresses, each of which may correspond to a network host, peripheral device, disk sector, a memory cell or other logical or physical entity. For software programs to save and retrieve stored data, each unit of data must have an address where it can be individually located or else the program will be unable to find and manipulate the data. The number of address spaces available will depend on the underlying address structure and these will usually be limited by the computer architecture being used.

As shown in FIG. 2B, the host 120 will utilize its own address space, identified herein as host address space 225. Meanwhile, any other SoC will utilize its own address space. For example, the address space of the SoC 200 is identified herein as local address space 235. Finally, PCI supports its own memory space, identified herein as PCI address space 245.

When requesting data from a processing subsystem 260, the host 120 will provide an address H1, H2, etc. in the host address space 225 for the processing subsystem 260 to provide that data. For example, the host 120 may provide an address H1, H2, etc. in the host address space 225 that is mapped to a location in the host memory 124 of the host 120. The host space 225 may be mapped to the PCI address space 245, for example using an input-output memory management unit (IOMMU) or 1-to-1 mapping. Accordingly, the host 120 may be programmed to provide a PCI address P1, P2, etc. to the processing subsystem 260. A processing subsystem 260 in an SoC 200 will provide that data to an address L1, L2, etc. in the local address space 235. The local address space 235 of the SoC 200 will have an outbound address space 238 for outputting data to the host system 120. Other local addresses L1, L2, etc. in the local address space 245 will be provided for other functions and components of the SoC 200.

Figure 2C:
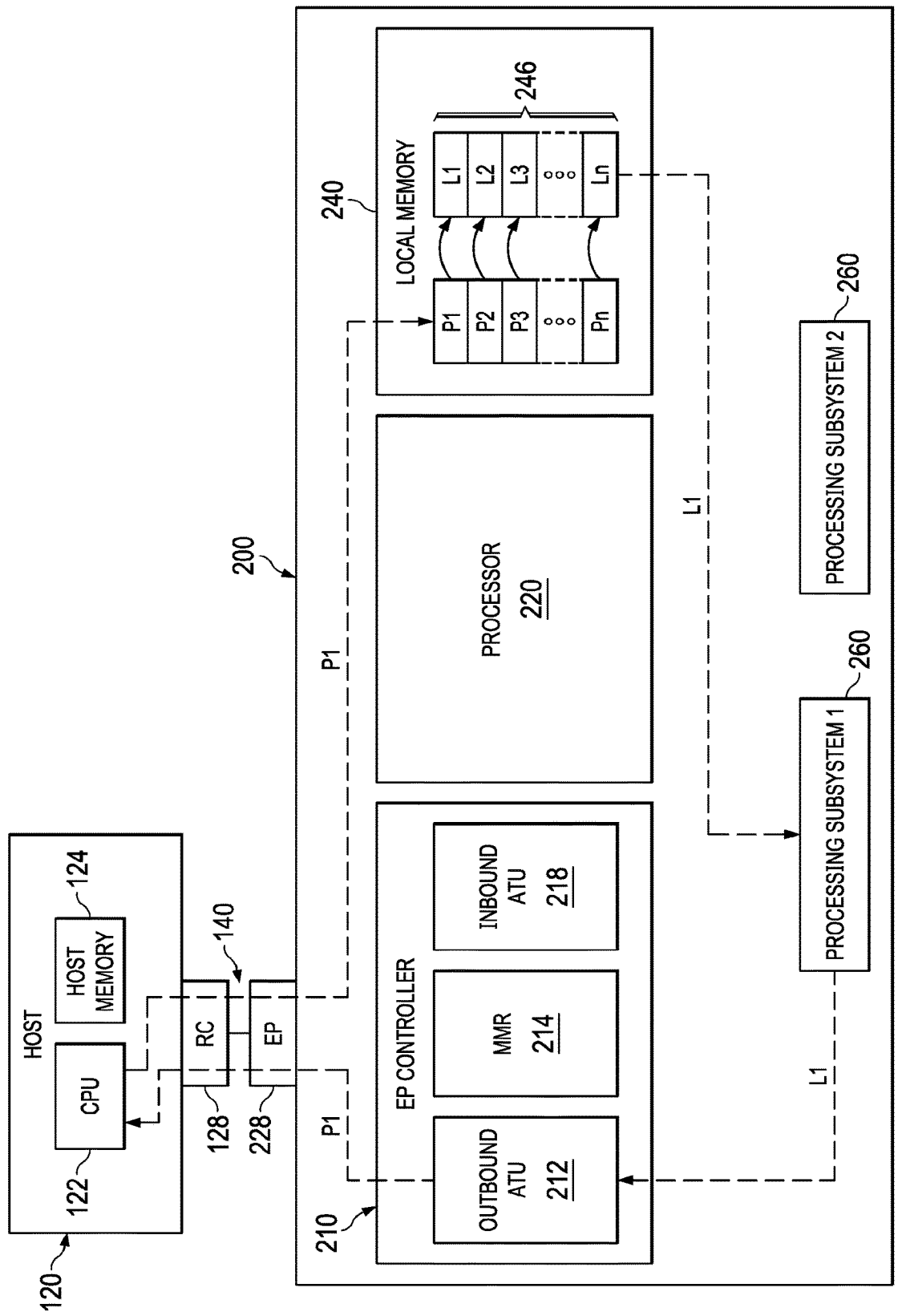

FIG. 2C is a diagram of a conventional method for a conventional SoC 200 to output data to an address provided by a host 120.

As shown in FIG. 2C, when requesting information from a processing subsystem 260, the host 120 will output descriptors that describe the work to be done by the processing subsystems 260. Those descriptors form a work queue 246 for the processing subsystems 260. Those descriptors include a buffer pointer identifying an address to provide the data. As described above, the host 120 can be configured to provide an address (e.g., P1) in the PCI address space 245.

If a processing subsystem 260 tries to provide data to the address P1 in the local address space 235, however, that address P1 is not likely to be the local address (e.g., L1) in the outbound address space 238 that is mapped to the PCI address P1 provided by the host 120. In fact, that address P1 in the local address space 235 is likely to conflict with another function of the SoC 200. Therefore, conventional SoCs 200 translate each PCI address P1, P2, etc. in each descriptor to a local addresses L1, L2, etc. in the outbound address space 238 of the local address space 235. That local address L1, L2, etc. is then provided to the processing subsystem, which provides the data to the local address L1, L2, etc. Once the processing subsystem 260 outputs the information to a local address L1, L2, etc., the outbound ATU 212 of the endpoint controller 210 translates the local address L1, L2, etc. back to the PCI address P1, P2, etc.

Translating every PCI address P1, P2, etc. to a local address L1, L2, etc., as is done by conventional SoCs 200, is very inefficient. Software running on the SoC 200 must be programmed to understand the format and semantics of every descriptor for every processing subsystem 260. Meanwhile, PCI addresses must be translated for every buffer or every packet each time work is enqueued. A conventional SoC 200 cannot perform a one-time process to map every address in the PCI address space 245 to a unique address in local address space 235. Because the PCI address P1, P2, etc. may point to nearly any address in the host memory 124, each PCI address P1, P2, etc. in each descriptor must be individually translated to a local address L1, L2, etc. This creates significant overhead as a significant number of processing cycles could need to be performed by the conventional SoC 200. It also adds latency to each transaction.

Alternatively, the host 120 could be programed to output a limited number of buffer pointers to the SoC 200 and translate all PCI addresses P1, P2, etc. output to the conventional SoC 200 to local addresses L1, L2, etc. in the local memory space 235 of the SoC 200. Such a custom implementation would eliminate the need for the SoC 200 to translate every buffer or packet in every descriptor. However, that custom implementation would not comply with current standards and therefore cannot be implemented using any generic, currently available host 120 and any generic, currently available processing subsystem 260 (as described below).

Conventional SoCs 200 have additional drawbacks. Peripherals occasionally generate interrupt requests to request that the processor 122 of the host 120 interrupt the currently executing code so that an event can be processed in a timely manner. Processing subsystems 260 in an SoC can only interrupt a core in the local system (e.g., the processor 220 of the SoC 200). Therefore, those interrupt requests need to be propagated to the remote host 120 via the PCI bus 140.

Additionally, the host 120 will reserve locations in the host memory 124 for each endpoint function. For example, the host 120 will identify buffers in the host memory 124 to be used by a USB peripheral and separate buffers to be used by an ethernet peripheral. An SoC multi-function endpoint should ideally guarantee isolation between each processing system 260 so that a peripheral attached to one endpoint function does not access the memory reserved for other endpoint function. However, conventional multi-function endpoints integrated in an SoC 200 do not permit isolation between functions.

Additionally, the SoC should ideally be compatible with any host 120 that uses only generic drivers for the processing subsystems 260. Peripheral drivers for hosts 120 are generally open source. For example, the extensible host controller interface (xHCI), a computer interface specification that defines a register-level description of a host controller for USB devices, has an open source peripheral driver for execution by a host 120. A configurable SoC multi-function endpoint controller that requires modification of those drivers would have limited applicability. Similarly, a configurable SoC multi-function endpoint controller that requires the host 120 to store the address space of the endpoint or have point solutions for that endpoint would also lack compatibility with existing hosts 120.

Finally, the configurable SoC multi-function endpoint controller should ideally be compatible with existing processing subsystems 260. As described above, depending on the particular implementation, the SoC should be reconfigurable so some peripheral subsystems 260 are available to the host 120 and others provide information to local memory 240. Meanwhile, in some implementations, the SoC may include as many as fifty or sixty peripheral devices. Those hardware peripheral devices are supplied by vendors and the software drivers for those peripheral devices are mandated by standards. A configurable multi-function PCIe endpoint controller integrated in an SoC that requires custom changes to each processing subsystem 260 for that processing subsystem 260 to be available to the host 120 would limit the applicability of the configurable SoC multi-function endpoint controller. Therefore, the configurable SoC multi-function endpoint controller should ideally be configurable such that, depending on the particular implementation, existing processing subsystems 260 may be made available to a host 120 or made to provide information to local memory 240.

Figure 3:
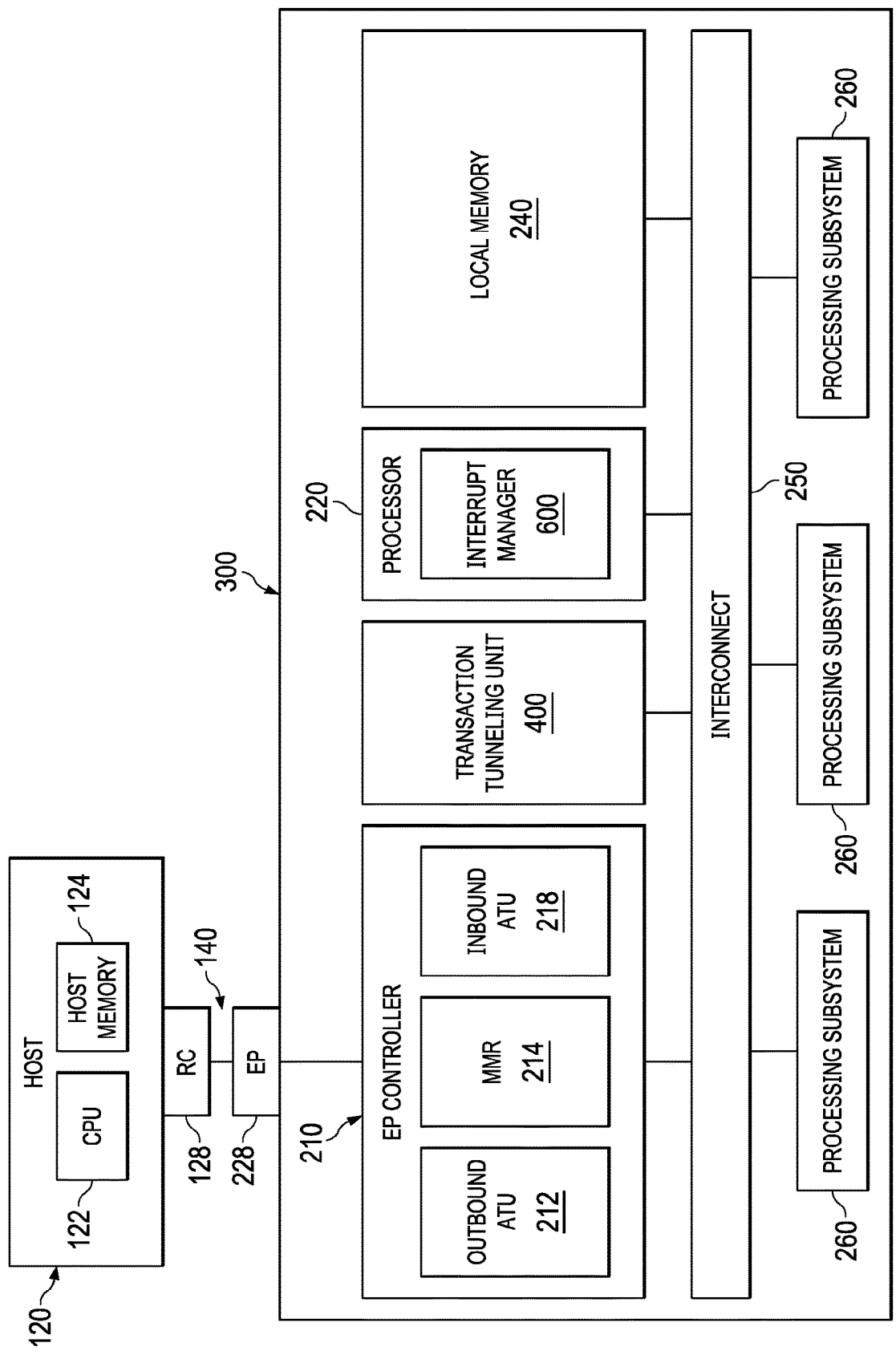
FIG. 3 is a block diagram illustrating a configurable multi-function PCIe endpoint controller in an SoC according to an illustrative embodiment.

FIG. 3 is a block diagram illustrating a configurable multi-function endpoint controller integrated in an SoC 300 according to an illustrative embodiment.

Like conventional multi-function PCIe endpoint controllers integrated in an SoC 200, the configurable multi-function endpoint controller integrated in an SoC 300 includes an endpoint connector 228, an endpoint controller 210, a processor 220, local memory 240, and processing subsystems 260 (e.g., peripheral devices) that communicate via an interconnect 250. However, as shown in FIG. 3 and described in detail below, the configurable multi-function PCIe endpoint controller integrated in an SoC 300 also includes a centralized transaction tunneling unit 400 that eliminates the need for software intervention and translation and a multi-function interrupt manager 600 that propagates interrupt requests received from processing subsystems to the host 120.

Figure 4:
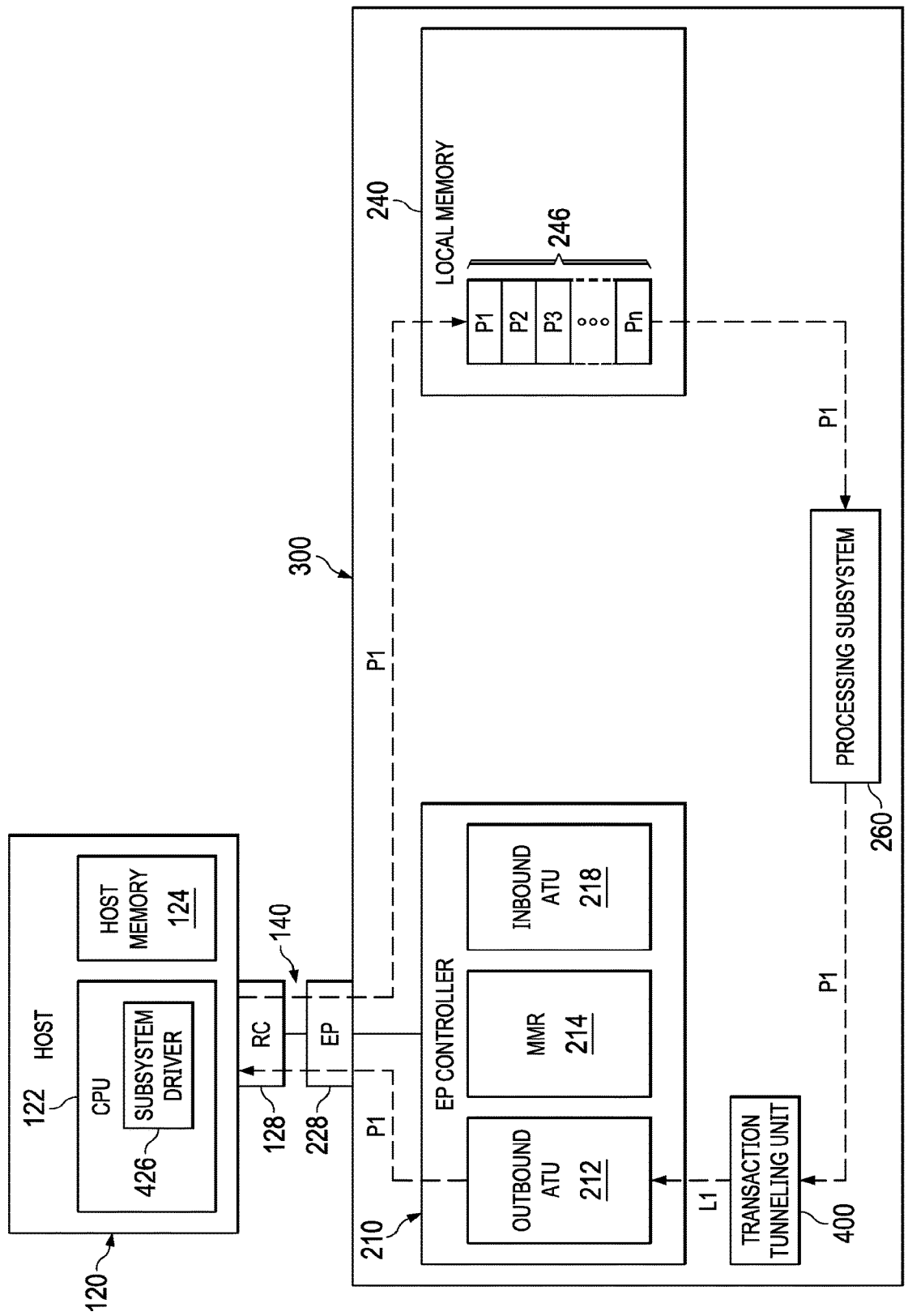
FIG. 4 is a block diagram illustrating the centralized transaction tunneling unit of the configurable multi-function PCIe endpoint controller in an SoC according to an illustrative embodiment.

FIG. 4 is a block diagram illustrating the centralized transaction tunneling unit 400 of the configurable multi-function PCIe endpoint controller integrated in an SoC 300 according to an illustrative embodiment.

As shown in FIG. 4, the centralized transaction tunneling unit 400 allows the host 120 to add descriptors to the work queue 246 that include PCI addresses P1, P2, etc. Any processing system 260 configured to provide functionality for the host 120 can consume and output those PCI addresses P1, P2, etc. However, the processing systems 260 configured to provide functionality for the host 120 forward their traffic through the centralized transaction tunneling unit 400, which translates PCI addresses P1, P2, etc. to a local address of the SoC 300 (e.g., address L1). The outbound ATU 212 then translates that local address L1 back to the appropriate PCI address P1, P2, etc. indicated by the host 120.

Unlike conventional SoC endpoint controllers, which require software to parse each descriptor and translate the address of each buffer or packet in the work queue 246, the centralized transaction tunneling unit 400 (and the outbound ATU 212) perform region-based address translation, which does not suffer from the drawbacks of software-implemented translation described above. To perform region-based translation, a portion of one address space is set aside to correspond to a portion of another address space utilized by another system. As shown in FIG. 2B, for example, to enable the outbound ATU 212 to convert a local address L1, L2, etc. to the corresponding PCI address P1, P2, etc., a portion of the local address space 235—that is the exact size of the portion of the PCI address space 245 used by the host 120 when requesting data from the SoC 300—is configured as an outbound address space 238 that corresponds to the portion of the PCI address space 245 used by the host 120 to request data from the configurable SoC multi-function endpoint controller 300. The outbound ATU 212 can then translate each address in the outbound address space 238 to an address in the PCI address space 245 by simply offsetting each local address L1, L2, etc. by the predetermined amount. The centralized transaction tunneling unit 400 performs the region-based translation performed by the outbound ATU 212 in reverse, translating the PCI address P1 to the local address L1 that corresponds to the PCI address P1.

The centralized transaction tunneling unit 400 provides a number of benefits. Any host 120 can output descriptors identifying PCI addresses P1, P2, etc. without being customized to understand the local address space 235 of the SoC 300. Instead, the host 120 can use the generic, available driver 426 for the processing subsystem 260. Because the centralized transaction tunneling unit 400 uses hardware to perform region-based address translation, the SoC 300 does not need software to intervene and translate each address that is consumed by any processing subsystem 260 that outputs to the host 120. Region-based translations require only a one-time setup when the SoC 300 is being initialized. Eliminating the software intervention performed by conventional SoC endpoint controllers reduces overhead and latency. The centralized transaction tunneling unit 400 is generic, meaning it can be used for any processing subsystem 260 configured to provide functionality to the host 120, and scalable, meaning it can provide centralized address translation for any number of processing subsystems 260. Finally, each processing subsystem 260 can be configured to output data via the centralized transaction tunneling unit 400, which prevents conflicts with any other processing subsystem 260, without individual modifications to each processing subsystem 260.

The centralized transaction tunneling unit 400 also enables the SoC 300 to provide isolation between each processing subsystem 260.

Figure 5:
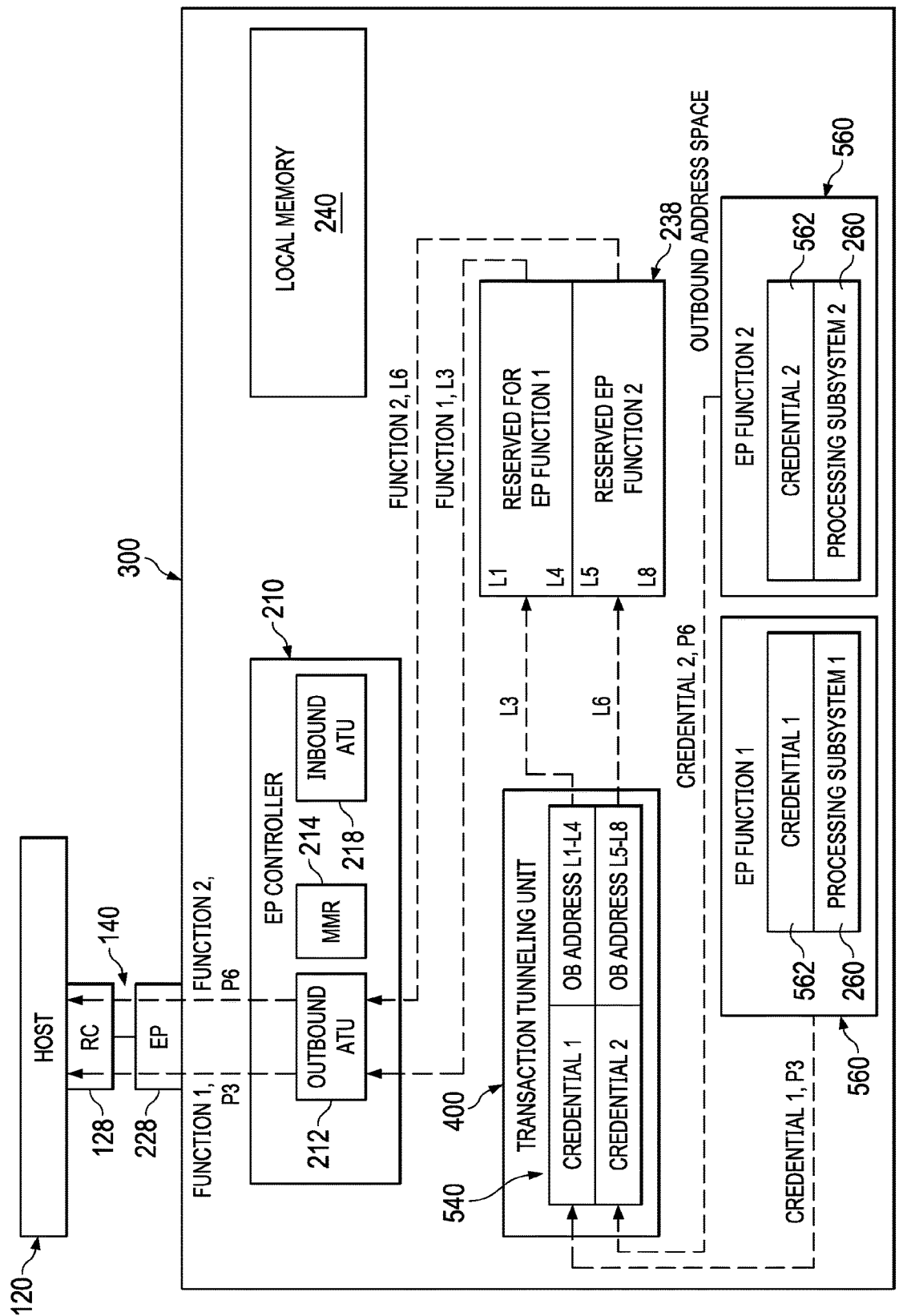
FIG. 5 is a block diagram illustrating the isolation functionality provided by the centralized transaction tunneling unit of the SoC in which a multi-function endpoint controller is integrated according to an illustrative embodiment.

FIG. 5 is a block diagram illustrating the isolation functionality provided by the centralized transaction tunneling unit 400 of the SoC 300 according to an illustrative embodiment.

As shown in FIG. 5, each processing subsystem 260 provides one or more functions 560. Meanwhile, the SoC 300 includes an outbound address space 238 for processing subsystems 260 configured to provide functionality to the host 120. During configuration of the SoC 300, the centralized transaction tunneling unit 400 reserves partitions in the outbound address space 238 for each function 560. In the example shown in FIG. 5, for instance, addresses L1-L4 are reserved for Function 1 and addresses L5-L8 are reserved for Function 2. (Those addresses L1-L8 in the outbound address space 238 are mapped to PCI addresses P1, P2, etc. by the outbound ATU 212, as described above. During configuration of the SoC 300, the host 120 provides PCI addresses P1, P2, etc. reserved for each function 560.)

The size of each partition can be set by policy during the configuration of the SoC 300. For instance, the SoC 300 may be configured to apportion equal sized memory regions in the outbound address space 238 to each function 560. Alternatively, to configure one endpoint function 560 to provide data to more memory regions of the host memory 124, a larger portion of the outbound address space 238 is apportioned to that endpoint function 560.

During configuration of the SoC 300, the size of the partition apportioned to each function 560 is identified and provided to the driver 426 of the subsystem 260 installed on the host 120 that provides that function 560. Accordingly, the host 120 allocates a buffer in the host memory 124 that is within the size of the partition reserved for that function 260 in the outbound address space 238. The function 560 then provides data to the buffer allocated in the host memory 124 by accessing the partition in the outbound address space 238 reserved for that function 560.

Each processing subsystem 260 can be configured to output a unique credential 562 along with the data for transmittal to the host 120. The centralized transaction tunneling unit 400 may then store a translation table 540 mapping each credential 562 to the addresses in the outbound address space 238 reserved for the function 560 that generated that credential 562. Accordingly, the centralized transaction tunneling unit 400 ensures isolation between the functions 560 and prevents one function 560 from writing to locations L1-L8 in the outbound address space 238 reserved for another function 560. Additionally, because those locations L1-L8 in the outbound address space 238 are mapped to PCI locations P1 P2, etc. in the host memory 124 of the host 120, the centralized transaction tunneling unit 400 prevents one function 560 from writing to locations P1, P2, etc. in the host memory 124 reserved for another function 560.

Figure 6:
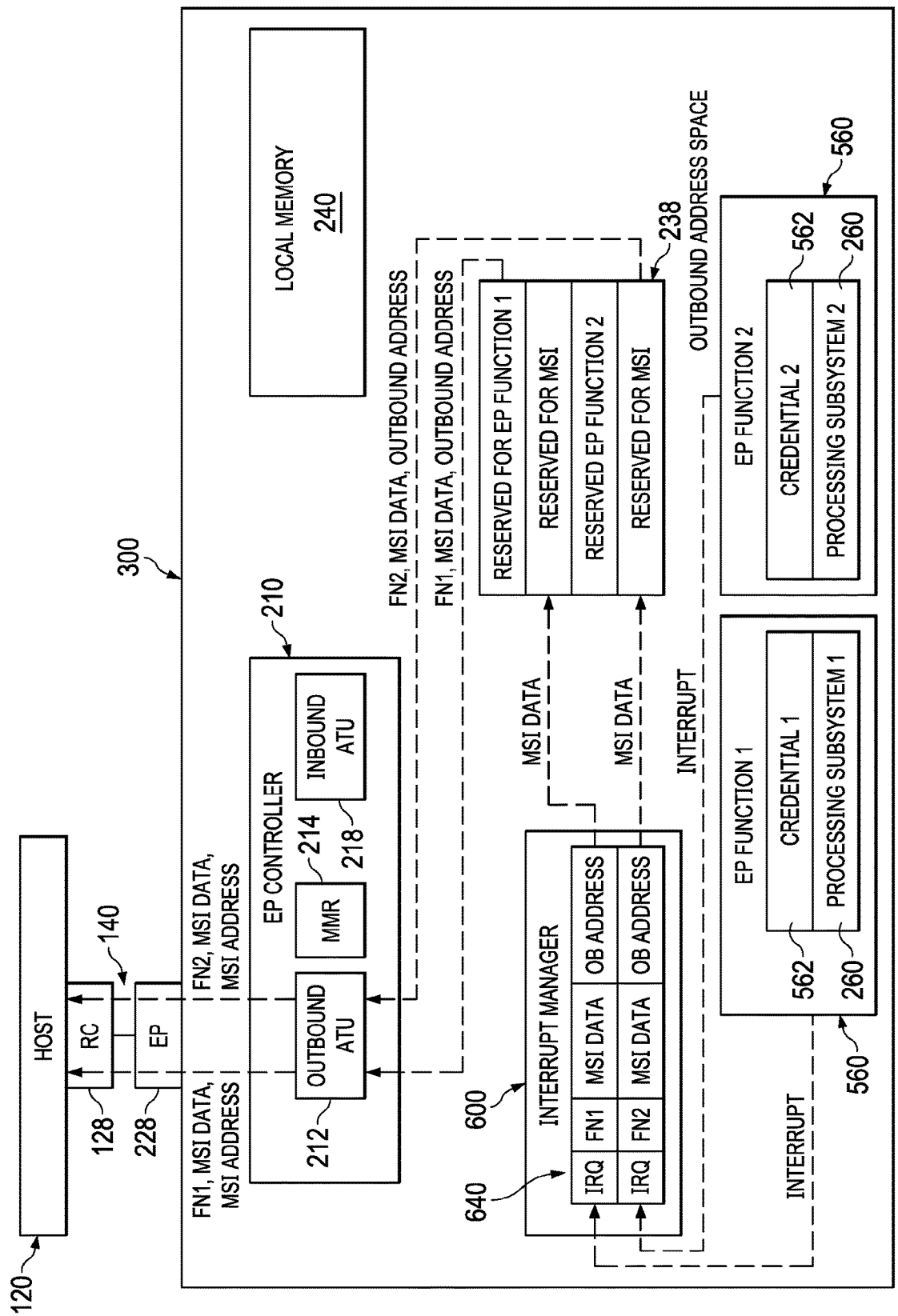
FIG. 6 is a block diagram illustrating the interrupt manager of the of the SoC in which a multi-function endpoint controller is integrated according to an illustrative embodiment.

FIG. 6 is a block diagram illustrating the multi-function interrupt manager 600 of the SoC 300 according to an illustrative embodiment.

As described above, peripherals occasionally generate interrupt requests to request that the processor 122 of the host 120 interrupt the currently executing code so that an event may can be processed in a timely manner. Processing subsystems 260 in SoC 300 can only interrupt a core in the local system. Therefore, those interrupt requests need to be propagated to the remote host 120 via the PCI bus 140. Accordingly, the SoC 300 may include a multi-function interrupt manager 600 that provides centralized functionality to receive interrupt requests from each endpoint function 560 and dispatch those interrupt requests to the host 120 in the format specified by the host 120.

Interrupt requests may be sent as message signaled interrupts (MSI), which include MSI data and are sent to a specified MSI address specified by the host 120. Each function 560 may generate a number of different interrupt requests, as dictated by the relevant standard. During configuration, the host 120 specifies the MSI data and MSI address for each interrupt request for each function 260.

As shown in FIG. 6, the multi-function interrupt manager 600 stores an interrupt table 640 identifying each potential interrupt request from each function 560 along with the MSI data specified by the host 120 during configuration of the SoC 300. The multi-function interrupt manager 600 also reserves portions of the outbound address space 238 for sending MSI data to the host 120. Those portions of the outbound address space 238 are mapped (by the outbound ATU 224, as described above) to the MSI addresses specified by the host 120 during configuration of the SoC 300.

When a function 560 outputs an interrupt request, the multi-function interrupt manager 600 outputs the MSI data specified in the interrupt table 640 to the outbound address in the outbound address space 238 reserved for that function 560 to output interrupt requests to the host 120.

The multi-function interrupt manager 600 is secure software that only outputs interrupt requests that are included in the interrupt table 640 established during configuration of the SoC 300. Meanwhile, the multi-function interrupt manager 600 uses regions in the outbound address space 238 that are dedicated to each function 560. Therefore, the multi-function interrupt manager 600 provides implicit authentication and security of interrupt requests and prevents a processing subsystem 260 from outputting an unauthorized interrupt request or an interrupt request to an MSI address of the host memory 124 reserved for a different function 560. The multi-function interrupt manager 600 may also be configured to output interrupt requests in priority order and therefore provide interrupt prioritization for latency sensitive operations.

Figure 7:
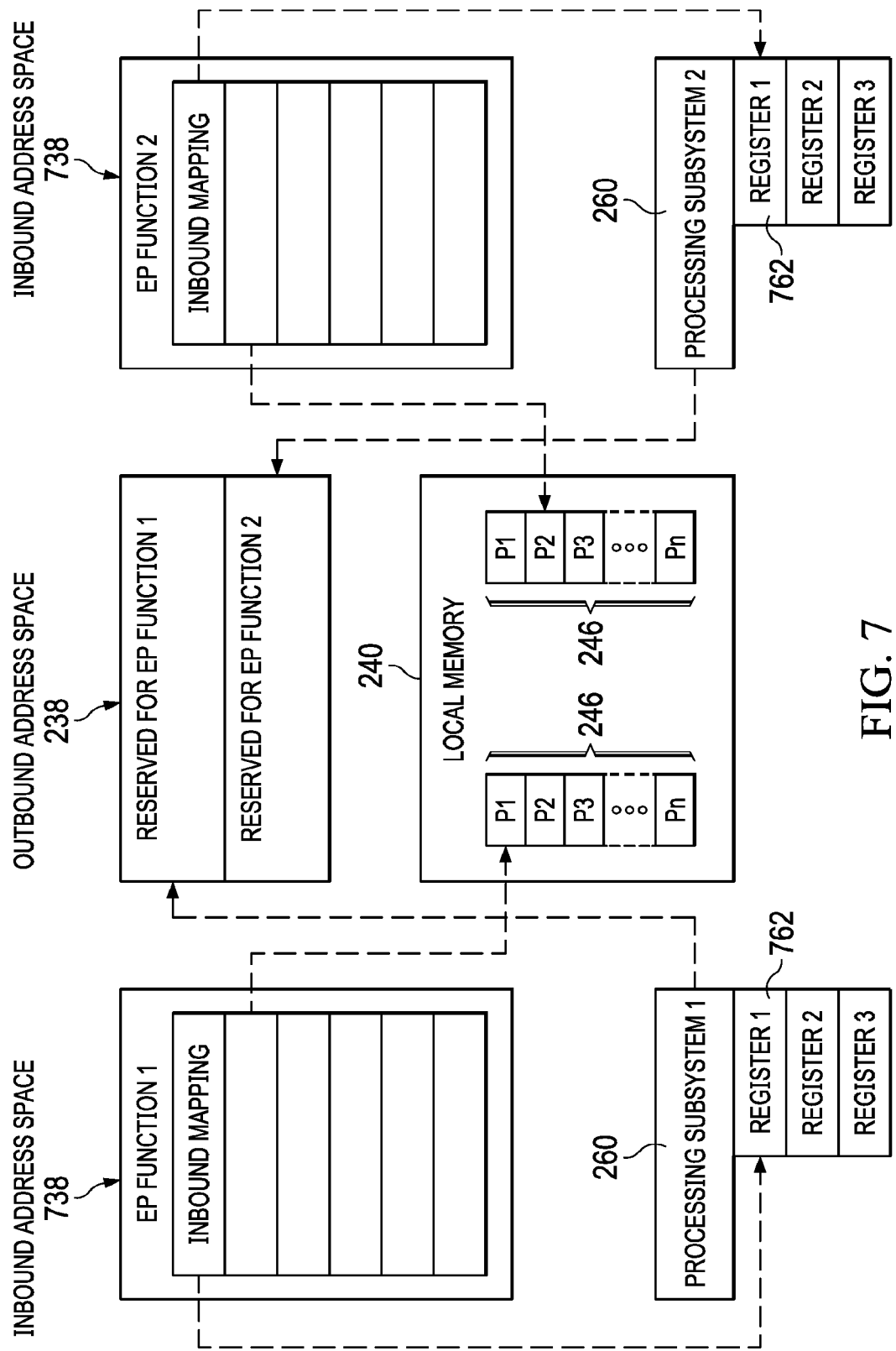
FIG. 7 is an overview of how the configurable multi-function PCIe endpoint controller in an SoC maps independent functions according to an illustrative embodiment.

FIG. 7 is an overview of how the SoC 300 maps independent functions 560 to processing subsystems 260 according to an illustrative embodiment.

As described above, the SoC 300 includes an outbound address space 238 that is partitioned for each endpoint function 560. The local address space 235 also includes an inbound address space 738 that is partitioned for each endpoint function 560. The inbound address space 738 includes a number of inbound ATU entries, for example six inbound ATU entries that each correspond to one of six base area registers (BARS). One entry in the inbound address space 738 is mapped to a control register 762 of the processing subsystem 260. Another entry in the inbound address space 738 maps to the work area where the host 120 can populate the buffer address P1, P2, etc. in the work queue 246.

Referring back to FIG. 3, in a preferred embodiment, the centralized transaction tunneling unit 400 is realized as a hardware device integrated into the SoC 300. In that same preferred embodiment, the multi-function interrupt manager 600 is realized as secure software (e.g., software instructions stored in local memory 240 and executed by the processor 220). However, as one of ordinary skill in the art will recognize, either or both of the centralized transaction tunneling unit 400 and the multi-function interrupt manager 600 may be realized as a hardware device or software instructions executed by the processor 220.

As described above, the SoC 300 is configurable such that some processing subsystems 260 are available to a host 120 while others provide information locally. Additionally, unlike conventional SoCs 200, the configurable multi-function endpoint controller integrated in the SoC 300 includes a centralized transaction tunneling unit 400 that eliminates the need for software intervention to translate every PCI address P1, P2, etc. provided by the host 120 to a local address L1, L2, etc. The SoC 300 also isolates each processing subsystem 260 so that a peripheral does not access the memory reserved for a different endpoint function 560. The SoC 300 also includes a multi-function interrupt manager 600 that forwards interrupt requests to the host 120 while implicitly authenticating each interrupt request propagated to the remote host 120 via the PCI bus 140.

Meanwhile, all of the functionality described above is provided by the SoC 300 without requiring any custom configuration of the processing subsystems 260 or the host 120. Accordingly, the SoC 300 is compatible with any processing subsystem 260 and any host 120 using any generic, available driver 426 for each processing subsystem 260.

Modifications are possible in the described embodiments, and other embodiments are possible, within the scope of the claims.

What is claimed is:

1. A method, comprising:
   receiving a descriptor, the descriptor including a peripheral component interface (PCI) address;
   translating, by a centralized transaction tunneling unit, the PCI address to a local address using region-based translation; and
   translating the local address, by an outbound address translation unit (ATU), to the PCI address.

2. The method of claim 1, further comprising:
   configuring an outbound address space such that each of a plurality of functions is assigned a partition in an outbound address space.

3. The method of claim 2, further comprising:
   receiving a unique credential from each of a plurality of processing subsystems that each perform one of the plurality of functions; and
   storing a translation table, by the centralized transaction tunneling unit, the translation table mapping each unique credential to the partition in the outbound address space.

4. The method of claim 1, further comprising:
   configuring an inbound address space such that the inbound address space includes at least one entry that is mapped to a control register of each of a plurality of processing subsystems.

5. The method of claim 4, wherein the inbound address space further includes an entry for each of a plurality of functions for a host to populate the PCI address for a processing subsystem to provide data.

6. The method of claim 1, further comprising:
   identifying a plurality of potential interrupt requests from a plurality of processing subsystems;
   receiving message signaled interrupts (MSI) data and an MSI address for propagating each of the potential interrupt requests; and
   storing an interrupt table identifying each potential interrupt request.

7. The method of claim 6, further comprising:
   outputting the MSI data to an outbound address in response to an interrupt request from one of the plurality of processing subsystems.

8. The method of claim 7, wherein the interrupt table is stored in local memory and the MSI data is output by a hardware computer processor, the local memory and the hardware computer processor being integrated in an SoC.

9. The method of claim 1, wherein the centralized transaction tunneling unit is realized by a hardware block integrated in an SoC.

10. A device, comprising:
    an endpoint controller configured to receive a descriptor, the descriptor including a peripheral component interface (PCI) address;
    a centralized transaction tunneling unit coupled to the endpoint controller and configured to translate the PCI address to a local address using region-based translation; and
    an outbound address translation unit (ATU) coupled to the centralized transaction tunneling unit and configured to translate the local address to the PCI address received from a host.

11. The device of claim 10, further comprising a plurality of processing subsystems; and wherein the centralized transaction tunneling unit stores a translation table mapping a unique credential for a processing subsystem to a partition in an outbound address space.

12. The device of claim 11, further comprising a memory; and wherein the memory stores an inbound address space such that the inbound address space includes at least one entry that is mapped to a control register of each of the processing subsystems.

13. The device of claim 12, wherein the inbound address space further includes an entry for each of a plurality of functions for the host to populate the PCI address for the processing subsystem.

14. The device of claim 11, further comprising an interrupt manager that stores an interrupt table identifying each potential interrupt request, MSI data, and an outbound address that corresponds to an MSI addresses.

15. The device of claim 14, wherein, in response to an interrupt request from one of the plurality of processing subsystems, the interrupt manager is configured to output the MSI data to the outbound address that corresponds to the MSI addresses.

16. The device of claim 15, wherein the interrupt manager is realized by secure software stored in memory and executed by a processor.

17. The device of claim 10, wherein the centralized transaction tunneling unit is realized by a hardware block integrated in an SoC.

* * * * *